Sept. 26, 1961 W. HORBERG 3,001,839
BEARING STRUCTURE
Filed June 2, 1958

INVENTOR.
William Horberg
BY
Johnson and Kline
ATTORNEYS

United States Patent Office 3,001,839
Patented Sept. 26, 1961

1

3,001,839
BEARING STRUCTURE
William Horberg, Trumbull, Conn., assignor to Horberg Grinding Industries, Inc., Bridgeport, Conn., a corporation of Connecticut
Filed June 2, 1958, Ser. No. 739,164
8 Claims. (Cl. 308—189)

This invention relates to improvements in bearing structures and, more specifically, to radial and thrust bearings and preloading and self-aligning means therefor.

In devices which embody radial and/or thrust bearings, the problem is often presented of eliminating radial and axial shaft play, vibration and noise without unduly increasing the cost of the finished product. Heretofore, attempts have been made to solve these problems by packing, machining the parts to very close tolerances and by resorting to complicated preloading and self-aligning structures, with little success; most of these efforts have failed to achieve their intended results or have increased the cost of manufacture to a prohibitive amount.

Accordingly, it is an object of this invention to provide a simple, readily manufactured bearing structure which, in operation, is free from detrimental shaft play and vibration and from undesirable noise.

It is also an object of the invention to provide an inexpensive, preloaded, self-aligning bearing structure for use in devices of varying character.

Another object of the invention is to provide a bearing structure wherein the bearing means, which are rotatably carried by a rotatable member, are preloaded for shiftable self-alignment with a stationary support member.

Another object of the invention is to provide in a bearing structure having a bearing means, including an inner and an outer race, means for preloading the bearing structure and for aligning the bearing means with a stationary support.

It is further an object of the invention to provide in a bearing structure, including a rotatable member and bearing means having inner and outer races, a stationary support member having socket means therein, formed with inclined faces, for shiftably receiving the bearing means, and means acting on the bearing means for forcing the same into engagement with the socket means, whereby the bearing structure is preloaded and the bearing means are aligned with the stationary support.

A still further object of the invention is to provide a stationary support member having socket means, with spherical faces formed therein for shiftably receiving the bearing means carried by a rotatable shaft to facilitate the preloading and self-aligning of the bearing structure.

Another object of the invention is to provide a preloaded self-aligning bearing structure which may readily be manufactured by quantity production methods and is of such rugged character it will function over a long period of time with freedom from all difficulties.

With these and other objects in mind, reference is had to the attached sheet of drawings, illustrating one form of the invention, wherein like characters represent like parts, and in which.

2

The invention is a preloaded self-aligning bearing structure wherein the bearing means, which are rotatably carried by a rotatable member, are shiftably received in socket means, having inclined faces, formed in a stationary support member. The concepts, which are basic to the invention, are applicable to substantially all bearing structures in which a shaft or similar rotatable member is carried by a stationary support and mounts a bearing means of the type that includes an inner and outer bearing race.

Figure 1:
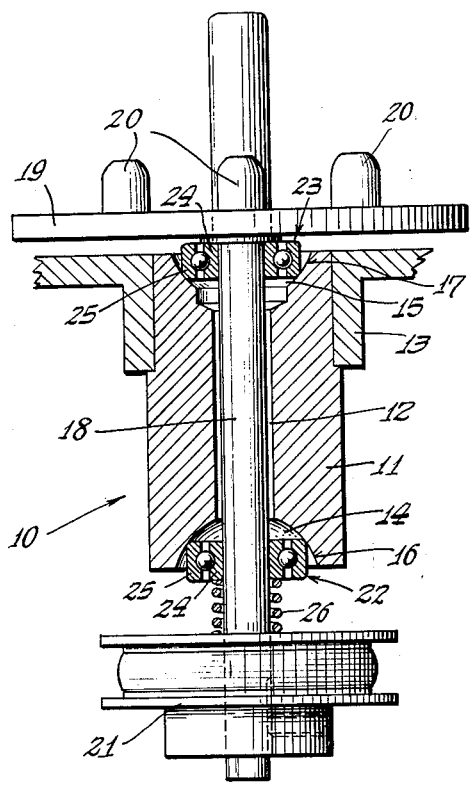
FIGURE 1 is a fragmentary elevational view, partially in section, illustrating a device embodying the bearing structure of the invention.

Referring now to the drawings for a more detailed description of the invention, in FIG. 1 a bearing structure generally indicated by the numeral 10, is illustrated in a drive spindle for a recorder spool. A stationary support member 11, which in this embodiment of the invention is in the form of a sleeve having a bore 12, is secured against movement in the frame 13 of a recorder or similar device. The sleeve, which may be formed in any desirable manner known to the art but which is preferable machined, is provided with sockets 14 and 15 having spherical faces 16 and 17 respectively. A rotatable member 18, here illustrated as a shaft carrying a spool support plate 19 formed with drive pins 20 at one end and a drive pulley 21 adjacent its opposite end, is loosely housed within bore 12 of stationary support member 11. Bearing means 22 and 23, of the type which include an inner and an outer race 24 and 25, respectively, are frictionally slidably mounted on rotatable shaft member 18 and shiftably received in socket means 14 and 15. It will be understood that any bearing means having an inner and outer race may be utilized in this invention and that for purpose of illustration only, ball bearings are shown. A tensioning means in the form of a helical spring 26 is carried by rotatable member 18 between pulley 21 and bearing means 22 to engage the inner race 24 of the bearing.

In the operation of the bearing structure above described, the helical spring 26, acting on inner race 24 of bearing means 22, forces that bearing means into engagement with socket means 14, thereby shifting sleeve 11 longitudinally of shaft 18, such that bearing means 23, which is retained against outward longitudinal movement with respect to the shaft by plate 19, is engaged in socket 15. During the preloading of the bearings by spring 26, the bearing means 22 and 23 shift within the sockets 14 and 15 such that they are properly aligned with stationary support member 11. Shifting relationship between the bearing means and the sockets 14 and 15 is facilitated by the chamfered corners of the bearing means which engage the spherical faces of the sockets. In the illustrated form of the invention the faces of the sockets have been defined as being spherical, however, it will be understood that inclined faces of other configuration may be resorted to.

Figure 3:
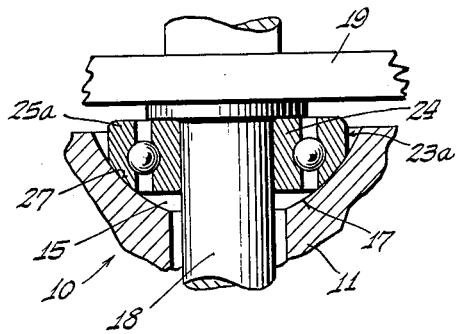
FIG. 3 is an enlarged fragmentary detail view, partially in section, illustrating a modification of the invention.

In FIG. 3 a modified form of bearing structure 10 has been illustrated. In this structure a bearing means 23a, similar to bearing means 23 in FIG. 1 has had its outer race 25a machined, as at 27, to provide a spherical surface having a center identical with the center of spherical face 17 of socket 15. By means of this construction a mating of the bearing means with the socket is accomplished and the shifting of the bearing means with respect to the socket is facilitated to achieve a fine self-aligning of the parts. It will be understood that the construction of bearing means 23a, illustrated in FIG. 3, is applicable to bearing means 22, in FIG. 1, and may be utilized in any bearing structure made, in accordance with this invention.

Figure 2:
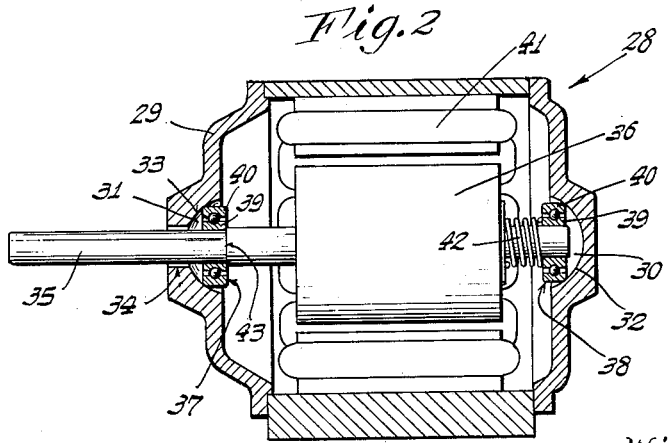
FIG. 2 is an elevational view, partially in section of a motor embodying the bearing structure of the invention.

Referring now to FIG. 2 the bearing structure of the invention is shown in a motor generally indicated by the numeral 28. A stationary support member 29 in the form of a motor housing is provided with sockets 30 and 31 having spherical faces 32 and 33, respectively. An opening 34 is formed in housing 29 through socket 31 and is adapted to loosely receive the outwardly extending end of a rotatable shaft member 35. The shaft 35, which fixedly carries a rotor 36, of any conventional kind, rotatably mounts bearing means 37 and 38, of the type which includes inner and outer races 39 and 40, respectively. Windings 41 of the type commonly known to the motor art, are provided in housing 29 for operable association with rotor 36. A helical spring tensioning means 42 is carried by shaft 35 between rotor 36 and bearing means 38 for forcing that bearing means into engagement with socket 30 and for shifting shaft 35, with rotor 36, toward bearing means 37. The bearing means 37, which may have its inner race 39 fixed to shaft 35 in any manner known to the art, or as here shown abutting a shoulder 43 formed on the shaft, is forced into engagement with socket means 31 to retain the shaft and rotor against further outward movement with respect to housing or stationary support member 29. As described above with respect to FIG. 1, the bearing means 37 and 38, which are preloaded by spring tensioning means 42, shift within their respective sockets to cause the proper alignment of the various elements of the bearing structure.

Thus, among others, the several objects of the invention as aforenoted are achieved. Obviously, numerous changes in the structure may be resorted to without departing from the spirit of the invention as defined by the claims.

I claim:

1. A self-aligning preloaded bearing structure comprising a rotatable member, a plurality of bearing means mounted on said rotatable member, each of said means including an inner and outer race and bearing members therebetween, said inner and outer races having bearing member engaging surfaces thereon, a stationary support member having a plurality of socket means therein provided with inclined faces, each of said socket means being adapted to receive one of said bearing means for shiftable movement about a transverse axis relative to said rotatable member and resilient means acting on said bearing means for forcing the same into shiftable engagement with said sockets so that said bearing structure is preloaded and said bearing member engaging surfaces of said outer races are aligned with said bearing member engaging surfaces of the respective inner races.

2. A self-aligning preloaded bearing structure comprising a rotatable member, a pair of spaced bearing means mounted on said rotatable member, said bearing means each including an inner and outer race and bearing members therebetween, said inner and outer races having bearing member engaging surfaces thereon, a stationary support member having a pair of spaced socket means therein provided with spherical faces, each of said sockets being adapted to receive the outer race of one of said bearing means for shiftable movement about a transverse axis relative to said rotatable member and resilient means acting on said bearing means for forcing the same into shiftable engagement with said sockets so that said bearing structure is preloaded and said bearing member engaging surfaces of said outer races are aligned with said bearing member engaging surfaces of the respective inner races.

3. A self-aligning preloaded bearing structure comprising a rotatable member; a pair of spaced bearing means mounted on said rotatable member, said bearing means each including an inner and outer race and bearing members therebetween and one of said means being axially secured with respect to said rotatable member, said inner and outer races having bearing member engaging surfaces thereon; a stationary support member having a pair of spaced socket means therein provided with spherical faces, each of said sockets being adapted to receive the outer race of one of said bearing means for shiftable movement about a transverse axis relative to said rotatable member; and resilient means acting on one race of one of said bearing means for forcing said pair of bearing means into shiftable engagement with their respective sockets so that said bearing structure is preloaded and said bearing member engaging surfaces of said outer races are aligned with said bearing member engaging surfaces of said respective inner races.

4. In a bearing structure including a rotatable member, a plurality of bearing means mounted on said rotatable member, said bearing means each including an inner and outer race and bearing members therebetween, said inner and outer races having bearing member engaging surfaces thereon, and a stationary support member; the improvement including a plurality of socket means provided with inclined faces formed in said stationary support member, each of said socket means being adapted to receive one of said bearing means for shiftable movement about a transverse axis relative to said rotatable member and resilient means acting on said bearing means for forcing the same into transversely shiftable engagement with said socket means so that said bearing structure is preloaded and said bearing member engaging surfaces of said outer races are aligned with said bearing member engaging surfaces of said respective inner races.

5. A self-aligning perloaded bearing structure comprising a rotatable member, a plurality of spaced bearing means mounted on said rotatable member, said bearing means each including an inner and an outer race and bearing members therebetween, said inner and outer races having bearing member engaging surfaces thereon, a stationary support member having a bore adapted to loosely receive said rotatable member and being formed with a plurality of socket means provided with inclined faces, each of said socket means being adapted to receive the outer race of one of said bearing means for shiftable movement about a transverse axis relative to said rotatable member and resilient tensioning means acting on the inner race of one of said bearing means for forcing the plurality of bearing means into transversely shiftable engagement with their respective socket means so that said bearing structure is preloaded and said bearing member engaging surfaces of said outer races are aligned with said bearing member engaging surfaces of the respective inner races.

6. A self-aligning bearing structure comprising a rotatable member, a stationary support member, a plurality of bearing means, each of said bearing means including bearing members and an inner and outer race, said races having bearing member engaging faces thereon, said bearing means being operably mounted between said rotatable member and said stationary support member, one of said members having a plurality of socket means therein provided with inclined faces, each of said socket means being adapted to receive one of said bearing means for shiftable movement about a transverse axis relative to said members, and means acting on said bearing means for forcing said bearing means into transversely shiftable engagement with said socket means so that said bearing structure is preloaded and said bearing member engaging faces of said outer races are aligned with said bearing member engaging faces of said inner races.

7. A self-aligning preloaded bearing structure as in claim 2, wherein said outer race of each of said bearing means is formed with a spherical surface adapted to mate with said spherical faces when said bearing means is engaged in its respective socket means.

8. A self-aligning preloaded bearing structure as in claim 7, in which said spherical faces have substantially the same center as said spherical surfaces.

(References on following page)

References Cited in the file of this patent

UNITED STATES PATENTS

| | | |
|---|---|---|
| 918,600 | Schacht | Apr. 20, 1909 |
| 1,364,675 | Almfelt | Jan. 4, 1921 |
| 1,811,679 | Volet | June 23, 1931 |
| 1,924,937 | Leister | Aug. 29, 1933 |
| 2,022,348 | Hoerle | Nov. 26, 1935 |
| 2,345,952 | Smith | Apr. 4, 1944 |
| 2,352,469 | Carlson | June 27, 1944 |
| 2,448,500 | Turner | Aug. 31, 1948 |
| 2,819,127 | Grobey | Jan. 7, 1958 |
| 2,822,182 | Merbler | Feb. 4, 1958 |
| 2,868,596 | Rattigan | Jan. 13, 1959 |

FOREIGN PATENTS

| | | |
|---|---|---|
| 380,468 | Germany | Sept. 10, 1923 |
| 601,787 | Great Britain | May 12, 1948 |